(12) United States Patent
Kiyozuka (10) Patent No.: US 10,015,355 B2
(45) Date of Patent: Jul. 3, 2018

(54) INFORMATION PROCESSING APPARATUS, NON-TRANSITORY COMPUTER READABLE MEDIUM, AND INFORMATION PROCESSING SYSTEM

(71) Applicant: FUJI XEROX CO., LTD., Tokyo (JP)

(72) Inventor: Kensuke Kiyozuka, Kanagawa (JP)

(73) Assignee: FUJI XEROX CO., LTD., Tokyo (JP)

(\*) Notice: Subject to any disclaimer, the term of this patent is extended or adjusted under 35 U.S.C. 154(b) by 0 days.

(21) Appl. No.: 15/438,005

(22) Filed: Feb. 21, 2017

(65) Prior Publication Data
US 2018/0048783 A1 Feb. 15, 2018

(30) Foreign Application Priority Data
Aug. 15, 2016 (JP) .................................. 2016-159132

(51) Int. Cl.
*G06F 3/12* (2006.01)
*H04N 1/32* (2006.01)
*H04N 1/00* (2006.01)
*G06K 9/00* (2006.01)
(Continued)

(52) U.S. Cl.
CPC ..... *H04N 1/32133* (2013.01); *G06K 9/00449* (2013.01); *G06K 9/00456* (2013.01); *G06Q 40/08* (2013.01); *H04N 1/00334* (2013.01); *H04N 1/00344* (2013.01); *H04N 1/00806* (2013.01); *H04L 67/42* (2013.01); *H04N 2201/0094* (2013.01); *H04N 2201/3226* (2013.01); *H04N 2201/3229* (2013.01); *H04N 2201/3242* (2013.01)

(58) Field of Classification Search
CPC ........... H04N 1/32133; H04N 1/00344; H04N 1/00806; H04N 2201/3226; H04N 2201/3229; H04N 2201/3242; G06K 9/00449; G06K 9/00456; G06Q 40/08; H04L 67/42
USPC ....................................................... 358/1.15
See application file for complete search history.

(56) References Cited

U.S. PATENT DOCUMENTS

| | | | |
|---|---|---|---|
| 2007/0130176 A1* | 6/2007 | Kawabe | G06F 17/248 |
| 2009/0112627 A1* | 4/2009 | Berkman | G06Q 50/22 705/3 |
| 2011/0032563 A1* | 2/2011 | Matsuzawa | H04N 1/00222 358/1.15 |

FOREIGN PATENT DOCUMENTS

JP 2012-173936 A 9/2012

\* cited by examiner

*Primary Examiner* — Neil R McLean
(74) *Attorney, Agent, or Firm* — Oliff PLC (57) ABSTRACT

Provided is an information processing apparatus including an acquiring unit that acquires plural documents, a type specifying unit that specifies types of the documents, a document specifying unit that specifies a key document as a target of a predetermined processing and a relevant document required for performing the processing among the plural documents based on the type specified by the type specifying unit, a processing specifying unit that specifies a processing corresponding to the key document among plural of the predetermined processing, and a determining unit that, in a case where the document specifying unit specifies plural key documents, specifies a dependency relationship of processing specified for the plural key documents among a key document and a relevant document related to the processing, and determines a performing order of the processing specified for the plural key documents based on the specified dependency relationship.

6 Claims, 8 Drawing Sheets

(51) Int. Cl.
*G06Q 40/08* (2012.01)
*H04L 29/06* (2006.01)

| DOCUMENT TYPE ID | DOCUMENT TYPE NAME | IDENTIFICATION INFORMATION |
|---|---|---|
| 1000 | LOAN AGREEMENT | 2D BARCODE |
| 1001 | DRIVER'S LICENCE | PATTERN OF RULED LINE |
| 1002 | RESIDENT CARD | DESIGNATION AT REGISTRATION |

| PROCE-SSING ID | PRO-CESS ID | ITEM ID | DOCUMENT ID OF KEY DOCUMENT | DOCUMENT ID OF RELEVANT DOCUMENT | PRO-GRESS STATE | PRE-PROCESS-ING ID | POST-PROCESS-ING ID | START DATE/TIME | COMPLE-TION DATE/TIME |
|---|---|---|---|---|---|---|---|---|---|
| 5001 | 2000 | 3000 | 4001 | 4002 4003 | PERFORMING STANDBY | 5002 | — | ... | ... |
| 5002 | 2001 | 3000 | 4002 | 4003 | DOCUMENT INSPECTION | — | 5001 | ... | ... |
| 5003 | 2002 | 3000 | 4003 | — | PERFORMING STANDBY | — | — | ... | ... |

| PRO-CESSING ID | PROCESS ID | ITEM ID | DOCUMENT ID OF KEY DOCUMENT | DOCUMENT ID OF RELEVANT DOCUMENT | PRO-GRESS STATE | PRE-PROCESS-ING ID | POST-PROCESS-ING ID | START DATE/TIME | COMPLE-TION DATE/TIME |
|---|---|---|---|---|---|---|---|---|---|
| 5011 | 2005 | ... | ... | ... | ... | | 5012 | ... | ... |
| 5012 | 2006 | ... | ... | ... | ... | 5012 | 5011 | ... | ... |
| 5013 | 2007 | ... | ... | ... | ... | 5011 | — | ... | ... |

| PRO-CESSING ID | PROCESS ID | ITEM ID | DOCUMENT ID OF KEY DOCUMENT | DOCUMENT ID OF RELEVANT DOCUMENT | PRO-GRESS STATE | PRE-PROCESS-ING ID | POST-PROCESS-ING ID | START DATE/TIME | COMPLE-TION DATE/TIME |
|---|---|---|---|---|---|---|---|---|---|
| 5005 | 2005 | ... | ... | ... | ... | | 5006 | 2016/08/01 10:00 | ... |
| 5006 | 2006 | ... | ... | ... | ... | 5006 | 5005 | 2016/08/01 09:35 | ... |
| 5007 | 2007 | ... | ... | ... | ... | 5005 | — | ... | ... |

INFORMATION PROCESSING APPARATUS, NON-TRANSITORY COMPUTER READABLE MEDIUM, AND INFORMATION PROCESSING SYSTEM

CROSS-REFERENCE TO RELATED APPLICATIONS

This application is based on and claims priority under 35 USC 119 from Japanese Patent Application No. 2016-159132 filed Aug. 15, 2016.

BACKGROUND

Technical Field

The present invention relates to an information processing apparatus, a non-transitory computer readable medium, and an information processing system.

SUMMARY

According to an aspect of the invention, there is provided an information processing apparatus including:

an acquiring unit that acquires plural documents;

a type specifying unit that specifies types of the documents;

a document specifying unit that specifies a key document as a target of a predetermined processing and a relevant document required for performing the processing among the plural documents based on the type specified by the type specifying unit;

a processing specifying unit that specifies a processing corresponding to the key document among plural of the predetermined processing; and a determining unit that, in a case where the document specifying unit specifies plural key documents, specifies a dependency relationship of processing specified for the plural key documents among a key document and a relevant document related to the processing, and determines a performing order of the processing specified for the plural key documents based on the specified dependency relationship.

BRIEF DESCRIPTION OF THE DRAWINGS

Exemplary embodiments of the present invention will be described in detail based on the following figures, wherein.

DETAILED DESCRIPTION

[Exemplary Embodiment]
(Overall Configuration)

Figure 1:
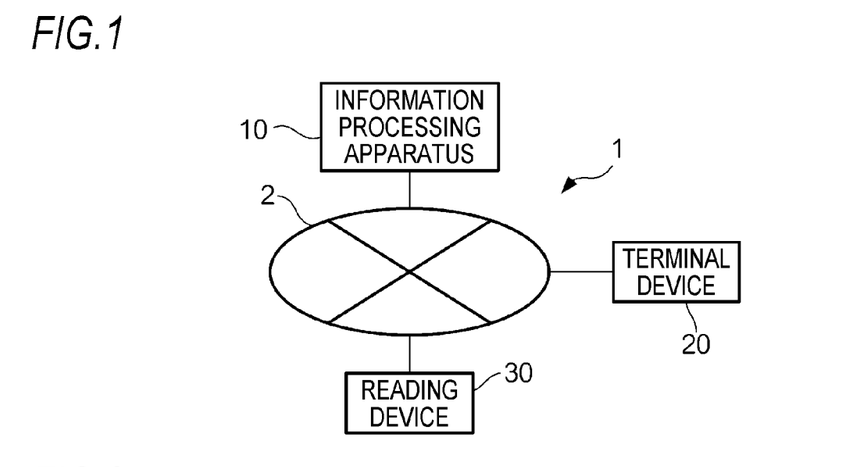
FIG. 1 is a view illustrating an apparatus pertaining to an information processing system according to an exemplary embodiment of the present invention.

FIG. 1 is a view illustrating an apparatus pertaining to an information processing system 1 according to an exemplary embodiment of the present invention. The information processing system 1 is, for example, a system for performing processing such as confirmation, inspection, or approval of documents handled by financial institutions. Documents handled by the information processing system 1 is not limited to those handled by the financial institutions but may include any other documents such as an insurance contract document, or an official document as long as they are to be subjected to processing such as confirmation, inspection, approval.

A communication line 2 is a communication network in which data communication is performed, and is connected with plural computer devices that perform data communication. The communication line 2 includes wired and wireless communication networks. In the present exemplary embodiment, an information processing apparatus 10, a terminal device 20 and a reading device 30 are connected to the communication line 2.

The reading device 30 optically reads paper documents and generates document data representing the read documents. Since the document data represents a document, in other words it may be referred to as a document. The reading device 30 accesses the information processing apparatus 10 via the communication line 2 and uploads the generated document data to the information processing apparatus 10. The reading device 30 may be a so-called multifunction device having plural functions such as an image forming function, an image reading function, or a facsimile function and so on. In the present exemplary embodiment, plural reading devices 30 may be connected to the communication line 2, but, in FIG. 1, only one reading device 30 is illustrated in order to avoid complication of the figure.

The terminal device 20 is a so-called desktop PC (Personal Computer), accesses the information processing apparatus 10 via the communication line 2, and serves as a client device of the information processing apparatus 10. In the present exemplary embodiment, plural terminal devices 20 may access the information processing apparatus 10, but, in FIG. 1, only one terminal device 20 is illustrated in order to avoid complication of the figure.

The information processing apparatus 10 is an apparatus that acquires and stores the document data generated by the reading device 30, and sets procedures of processing such as confirmation, inspection, or approval performed on the document data by an operator of the terminal device 20 and documents related to each of the processing. The information processing apparatus 10 acts as a server in a client-server system for the terminal device 20.

(Configuration of Information Processing Apparatus 10)

Figure 2:
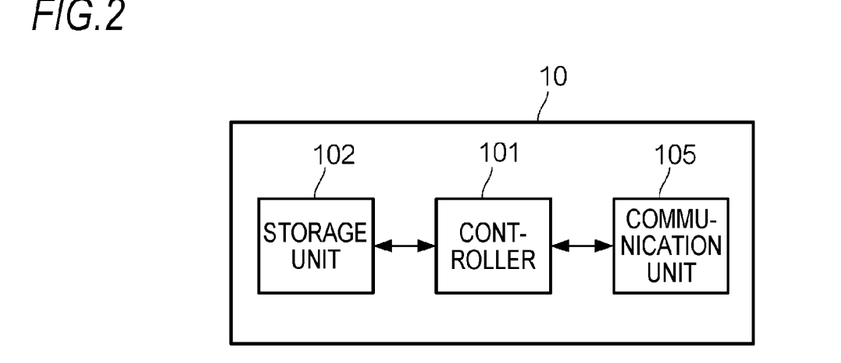
FIG. 2 is a block diagram illustrating an example of a hardware configuration of an information processing apparatus.

FIG. 2 is a block diagram illustrating an example of a hardware configuration of the information processing apparatus 10. A communication unit 105 functions as a communication interface for data communication and is connected to the communication line 2.

A storage unit 102 has a device (for example, a hard disk device) that permanently stores programs to be executed by a controller 101, document data sent from the reading device 30, or the like. As programs stored in the storage unit 102, there are a program of an operating system, a program for setting the procedures of processing performed by the operator of the terminal device 20 on the document data and setting documents related to each of the processing, or the like.

Further, the storage unit 102 stores various databases used by the controller 101 that executes a program. FIGS. 3 to 7 are examples of databases stored in the storage unit 102.

Figure 3:
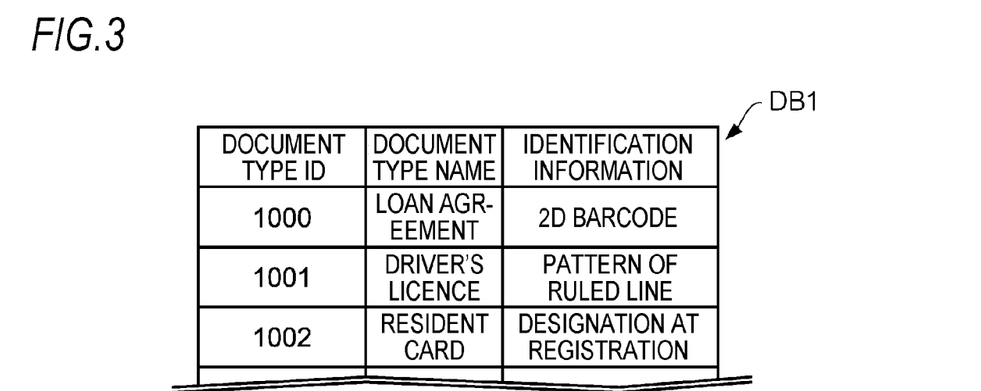
FIG. 3 is a view illustrating an example of a document type database.

A document type database DB1 illustrated in FIG. 3 has fields of a document type ID, a document type name and identification information. A document type ID which is an identifier indicating the type of a document is stored in the document type ID field. A type name of a document identified by the document type ID stored in the same row is stored in the document type name field. Identification information for identifying a document of the document type name stored in the same row is stored in the identification information field. For example, in the record of the second row of the document type database DB1 illustrated in FIG. 3, information on a driver's license used for identity verification is stored and a document type ID of the license is set as 1001. As the identification information, for example, a pattern of a ruled line of the driver's license is stored.

Figure 4:
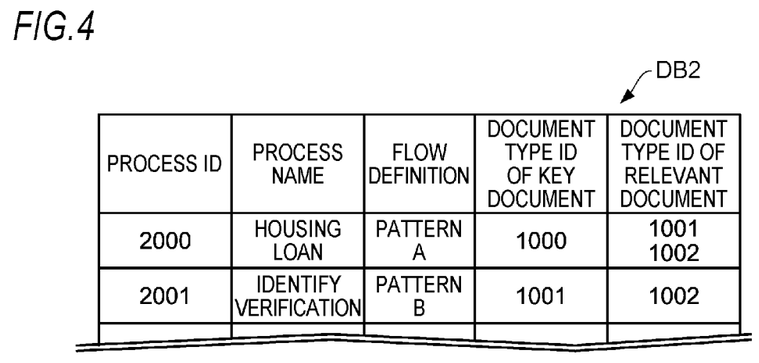
FIG. 4 is a view illustrating an example of a process definition database.

A process definition database DB2 illustrated in FIG. 4 has fields of a process ID, a process name, a flow definition, a document type ID of a key document, and a document type ID of a relevant document. A process ID which is an identifier for identifying a process of processing performed by the operator of the terminal device 20 on a document represented by the document data is stored in the process ID field. A process name of a process identified by a process ID stored in the same row is stored in the process name field. A procedure of a process identified by a process ID stored in the same row is stored in the flow definition field. As procedures of the process, for example, there are procedures such as confirmation of document defects, inspection, or approval. A document type ID of a key document to be mainly used in a process identified by a process ID stored in the same row is stored in the key document type ID field. A document type ID of a relevant document to be used in association with a key document used in a process identified by a process ID stored in the same row is stored in the relevant document type ID field.

For example, in the record of the first row illustrated in FIG. 4, information on a process performed on a document related to a housing loan in a financial institution is stored and a process ID is set as 2000. A document type ID of a key document mainly used in this process is set as 1000 representing a loan agreement. 1002 representing a resident card is stored as a document type ID of a document to be used in association with the key document in this process.

Figure 5:
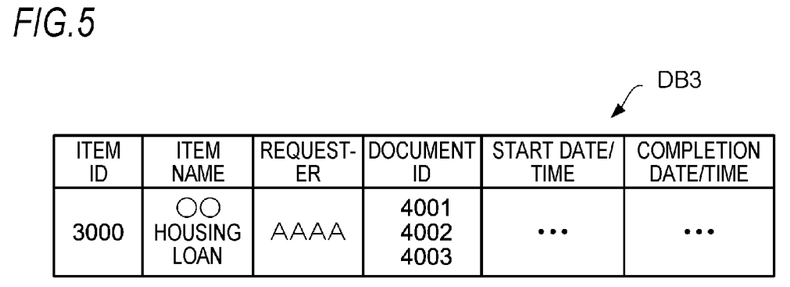
FIG. 5 is a view illustrating an example of an item database.

An item database DB3 illustrated in FIG. 5 has fields of an item ID, an item name, a requester, a document ID, a start date/time and a completion date/time. An item ID which is an identifier for identifying an item related to the document data sent from the reading device 30 is stored in the item ID field. An item name of an item identified by an item ID stored in the same row is stored in the item name field. A name of a person who requested processing of an item identified by an item ID stored in the same row is stored in the requester field. An identifier for identifying a document related to an item identified by an item ID stored in the same row is stored in the document ID field. Date and time at which the operator started a processing for a document related to an item identified by an item ID stored in the same row is stored in the start date/time field. Date and time at which the operator completed a processing for a document related to an item identified by an item ID stored in the same row is stored in the completion date/time field.

Figure 6:
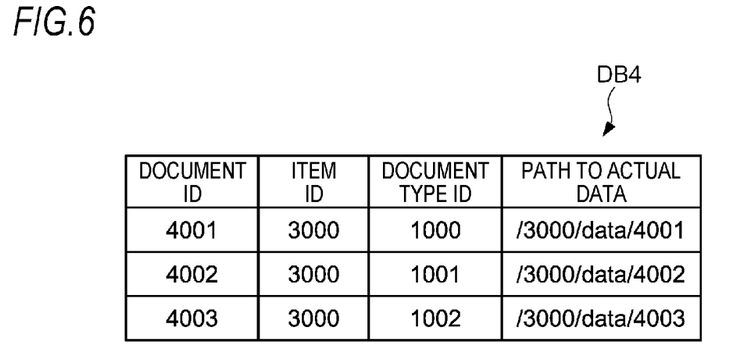
FIG. 6 is a view illustrating an example of a document database.

A document database DB4 illustrated in FIG. 6 has fields of a document ID, an item ID, a document type ID and a document data path. An identifier attached to a document represented by document data is stored in the document ID field. An item ID of an item related to a document ID stored in the same row is stored in the item ID field. A document type ID which is an identifier indicating the type of a document of a document ID stored in the same row is stored in the document type ID field. A path representing a storage location of a document of a document ID stored in the same row is stored in the document data path field.

Figure 7:
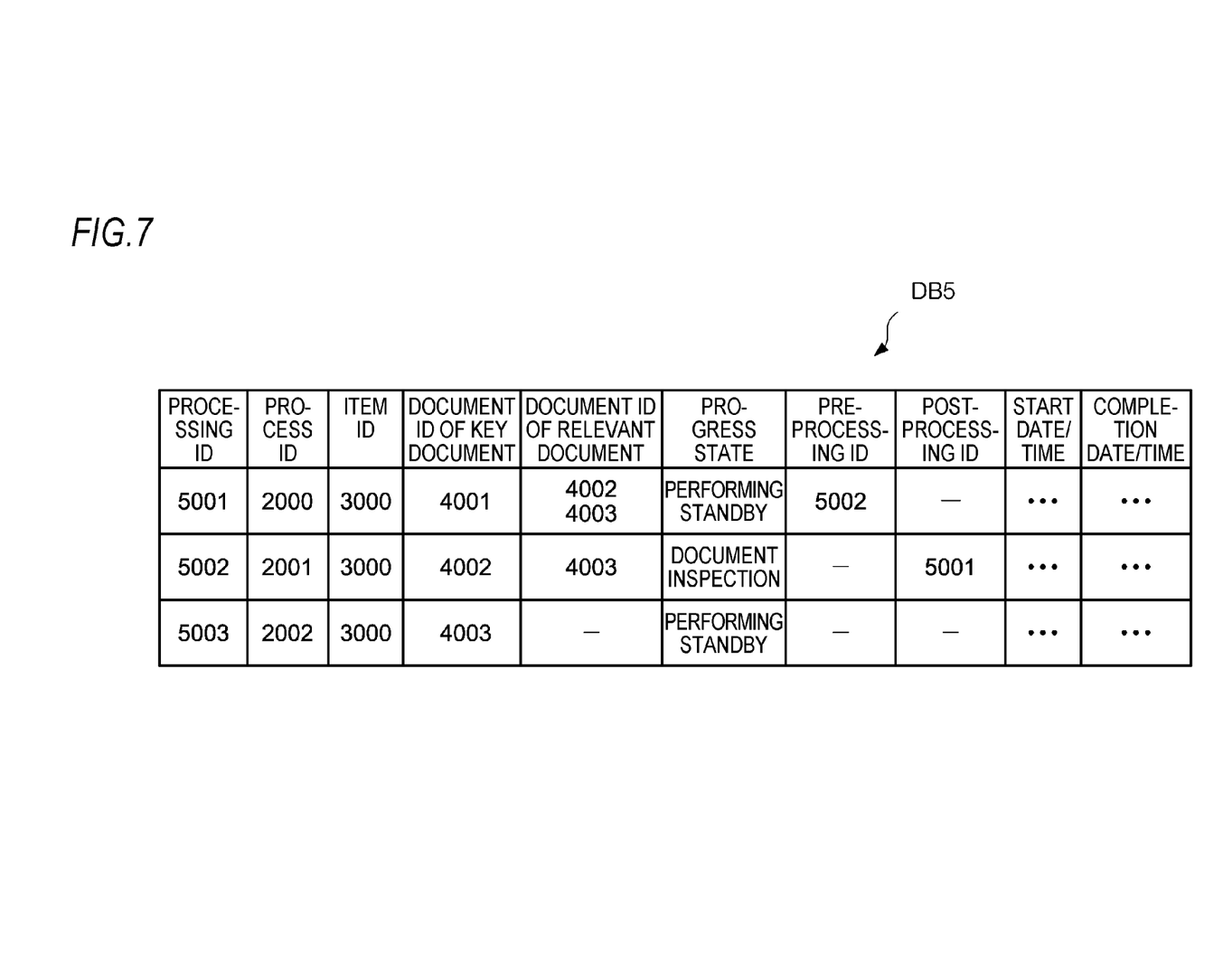
FIG. 7 is a view illustrating an example of a processing database.

A processing database DB5 illustrated in FIG. 7 has fields of a processing ID, a process ID, an item ID, a key document ID, a relevant document ID, a progress state, a pre-processing ID, a post-processing ID, a start date/time and a completion date/time. A processing ID that is an identifier for identifying a processing performed by an operator on a document represented by document data is stored in the processing ID field. A process ID representing a procedure of a processing performed on a document represented by document data is stored in the process ID field. A document ID of a key document used in a processing identified by a processing ID stored in the same row is stored in the key document ID field. A document ID of a relevant document used in a processing identified by a processing ID stored in the same row is stored in the relevant document ID field. An item ID of an item related to a document ID stored in the document ID field of a key document in the same row is stored in the item ID field. A progress state of a processing identified by a processing ID stored in the same row is stored in the progress state field. A processing ID of a processing performed before a processing identified by a processing ID stored in the same row is stored in the pre-processing ID field. A processing ID of a processing performed after a processing identified by a processing ID stored in the same row is stored in the post-processing ID field. A start date/time of a processing identified by a processing ID stored in the same row is stored in the start date/time field. A completion date/time of a processing identified by a processing ID stored in the same row is stored in the completion date/time field.

The controller 101 includes a CPU and a RAM and executes a program stored in the storage unit 102 to control the storage unit 102 and the communication unit 105.

Figure 8:
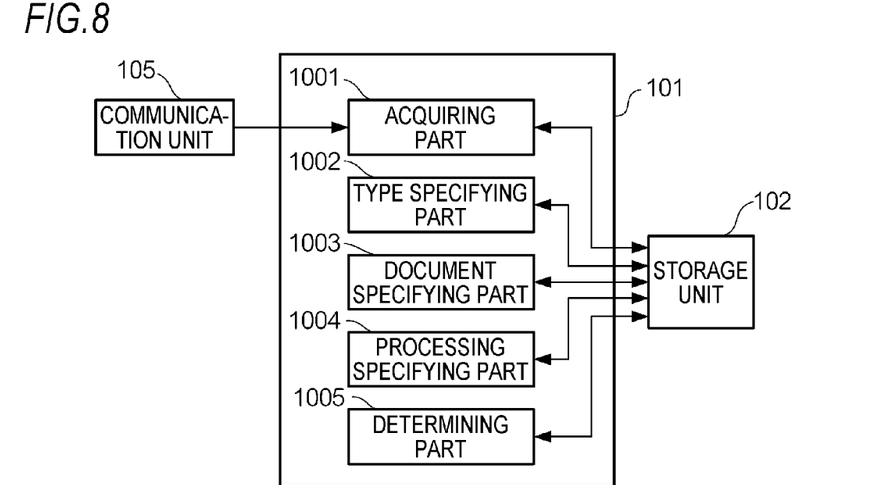
FIG. 8 is a functional block diagram illustrating a functional configuration of the information processing apparatus.

FIG. 8 is a functional block diagram of a function realized by executing a program. An acquiring part 1001, which is an example of an acquiring unit according to an exemplary embodiment of the present invention, acquires document data sent from the reading device 30. A type specifying part 1002, which is an example of a type specifying unit according to an exemplary embodiment of the present invention, specifies the type of a document represented by the document data. A document specifying part 1003, which is an example of a document specifying unit according an exemplary embodiment of the present invention, specifies document data of a key document and document data of a relevant document among plural document data. A processing specifying part 1004, which is an example of a processing specifying unit according to an exemplary embodiment of the present invention, selects a processing corresponding to a key document among plural predetermined processing. In a case where plural key documents are specified, a determining part 1005, which is an example of a determining unit according to an exemplary embodiment of the present invention, specifies the dependency relationship of processing specified for plural key documents from key documents and relevant documents related to the processing and uses the specified dependency relationship to determine a performing order of the processing specified for the respective plural key documents.

(Example of Operation of Exemplary Embodiment)

Next, an operation example of the present exemplary embodiment will be described. For example, a requester who requests processing of plural documents related to a housing loan operates the reading device 30 to input a name of the requester and a name of an item and sets a document related to the housing loan in the reading device 30. When the requester performs an operation to instruct reading of the set document, the reading device 30 reads the plural set documents and generates document data for each of the read documents. For example, when the reading device 30 reads a loan request form, a copy of a driver's license and a resident card as documents related to the housing loan, document data of the loan request form, document data of the copy of the driver's license and document data of the resident card are generated. When the generation of the document data is completed, the reading device 30 transmits the input requester name, the input item name and the generated document data to the information processing apparatus 10.

Figure 9:
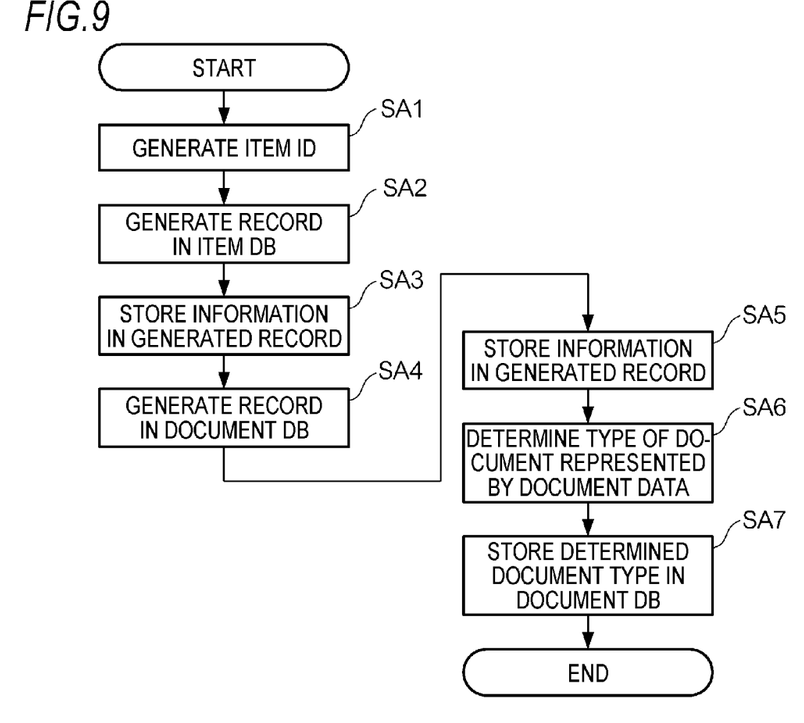
FIG. 9 is a flowchart illustrating a flow of a processing performed by a controller.

The controller 101 (the acquiring part 1001) acquires the requester name, the item name and the document data transmitted from the reading device 30. Upon acquiring the requester name, the item name and the document data, the controller 101 performs a processing illustrated in FIG. 9. Upon acquiring the requester name, the item name and the document data, the controller 101 generates an item ID (step SA1) and generates a new record in the item database DB3 (step SA2). The controller 101 stores information in the generated record (step SA3). Here, the controller 101 stores the generated item ID, the acquired item name and the acquired requester name in the generated record. For example, in a case where the acquired item name is "OO housing loan" and the acquired requester name is "AAAA," "OO housing loan" is stored in the item name field of the item database DB3 and "AAAA" is stored in the requester field of the item database DB3 as illustrated in FIG. 5.

Next, the controller 101 generates a new record for each of the acquired document data in the document database DB4 (step SA4) and stores information in the generated record (step SA5). Here, the controller 101 generates a document ID for each of the acquired document data, stores the generated document ID in the document ID field of the document database DB4, and stores a path of the document data in the field of a path to actual data. Further, the controller 101 stores an item ID of an item associated with the acquired document data in the item ID field of the document database DB4 and stores the generated document ID in the document ID field of the item database DB3.

For example, when the controller 101 generates a document ID "4001" for the document data of the above mentioned loan request form, the document ID "4001" is stored in the document ID field and a document data path of the loan request form is stored in the field of a path to actual data, as illustrated in FIG. 6. In addition, when the controller 101 generates a document ID "4002" for the document data of the copy of the driver's license, the document ID "4002" is stored in the document ID field, as illustrated in FIG. 6. When the controller 101 generates a document ID "4003" for the document data of the resident card, the document ID "4003" is stored in the document ID field, as illustrated in FIG. 6.

Next, the controller 101 (the type specifying part 1002) determines the type of the document represented by the acquired document data (step SA6). For example, when a two-dimensional barcode is included in an image of the document represented by the document data and the two-dimensional barcode has the content representing a loan agreement, the controller 101 determines that a document type ID of the document represented by the document data is "1000" by referring to the document type database DB1. When the image of the document represented by the document data is a copy of the driver's license, the controller 101 determines that a document type ID of the document data is "1001" from a pattern of a ruled line of the driver's license by referring to the document type database DB1.

Upon determining the type of the document represented by the document data, the controller 101 stores the determination result in the document type ID field of the document database DB4 (step SA7). For example, in a case where the type of the document represented by the document data whose document ID is 4001 is a loan agreement, a document type ID "1000" representing the loan agreement is stored in the document type ID field of the record in which 4001 is stored in the document ID field, as illustrated in FIG. 6. In a case where the type of the document represented by the document data whose document ID is 4002 is a copy of the driver's license, a document type ID "1001" representing the driver's license is stored in the document type ID field of the record in which 4002 is stored in the document ID field, as illustrated in FIG. 6.

Figure 10:
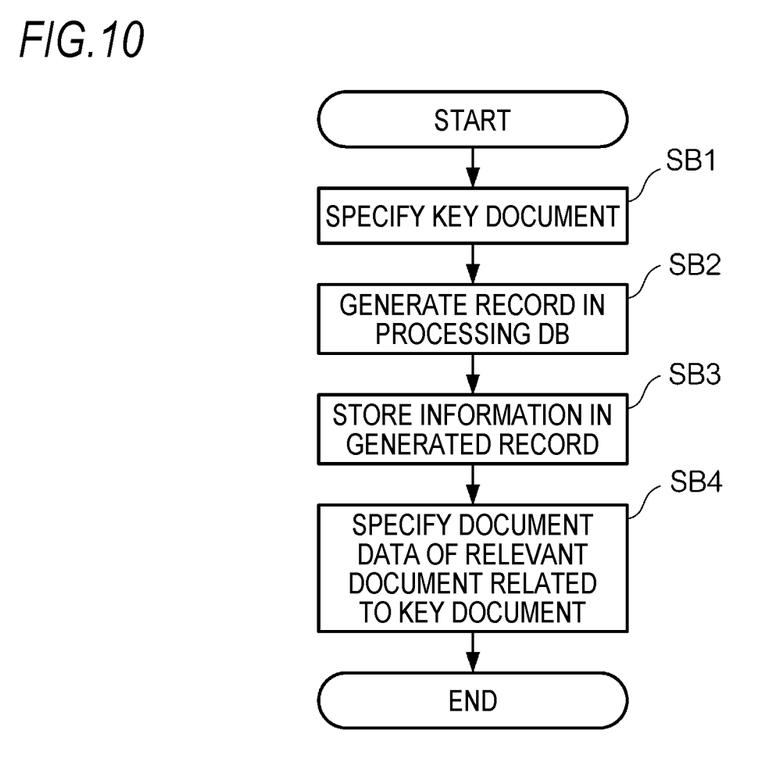
FIG. 10 is a flowchart illustrating a flow of a processing performed by the controller.

Next, the controller 101 sets a processing to be performed by the operator for the acquired document data. Here, the controller 101 performs a processing of a flowchart illustrated in FIG. 10. First, the controller 101 (the document specifying part 1003) refers to the document database DB4 and the process definition database DB2 to specify document data of a document to be a key document of a predetermined process from the acquired document data (step SB1).

For example, a document represented by document data whose document ID is "4001" has a document type ID of "1000." When the controller 101 searches for the document type ID "1000" in the document type ID field of a key document of the process definition database DB2 in FIG. 4, since the record of the first row is hit, the controller 101 determines that the document represented by document data whose document ID is "4001" is a key document. Upon specifying the document data to be the key document, the controller 101 generates a record in the processing database DB5 (step SB2). The controller 101 stores information in the generated record (step SB3). Here, the controller 101 generates a processing ID of a processing to be performed on the key document. Then, as illustrated in a record of the first row in FIG. 7, the controller 101 stores the generated processing ID "5001" in the processing ID field of the generated record and stores the document ID "4001" in the document ID field of the key document of the generated record. Further, the controller 101 (the processing specifying part 1004) stores the a process ID "2000" in the record of the first row, which is hit in the search of the document type ID, in the process ID field of the generated record, and stores an item ID "3000," which is associated with the document data whose document ID is "4001," in the item ID field of the generated record.

Next, the controller 101 (document specifying part 1003) specifies the document data of a relevant document related to the key document (step SB4). Here, the controller 101 acquires the document type IDs "1001" and "1002" stored in the document type ID field of the relevant document of the record of the first row hit by the search of the document type ID. The controller 101 searches the document database DB4 illustrated in FIG. 6 for a record storing the acquired document type ID "1001." Upon acquiring a document ID "4002" from the document ID field of a record of the second row hit in the search, the controller 101 determines that the document data with the document ID "4002" is document data of the relevant document. Then, as illustrated in the record of the first row in FIG. 7, the controller 101 stores the acquired document ID "4002" in the document ID field of the relevant document of the generated record. In addition, the controller 101 searches the document database DB4 illustrated in FIG. 6 for a record storing the acquired document type ID "1002." Upon acquiring a document ID "4003" from the document ID field of a record of the third row hit in the search, the controller 101 determines that the document data with the document ID "4003" is document data of the relevant document. Then, as illustrated in the record of the first row in FIG. 7, the controller 101 stores the acquired document ID "4003" in the document ID field of the relevant document of the generated record.

Next, a document represented by the document data whose document ID is "4002" has a document type ID of "1001." When the controller 101 searches for the document type ID "1001" in the document type ID field of the key document of the process definition database DB2 in FIG. 4, since the record of the second row is hit, the controller 101 determines that a document represented by the document data with the document ID "4002" is a key document. Upon specifying the document data to be the key document, the controller 101 generates a record in the processing database DB5 (step SB2). The controller 101 stores information in the generated record (step SB3). Here, the controller 101 generates a processing ID of a processing to be performed for the key document. Then, as illustrated in the record of the second row in FIG. 7, the controller 101 stores the generated processing ID "5002" in the processing ID field of the generated record and stores a document ID "4002" in the document ID field of the key document of the generated record. In addition, the controller 101 stores a process ID "2001" in the record of the second row, which is hit in the search of the document type ID, in the process ID field of the generated record, and stores an item ID "3000," which is associated with the document data having the document ID "4002," in the item ID field of the generated record.

Next, the controller 101 specifies the document data of a relevant document related to the key document (step SB4). Here, the controller 101 acquires the document type ID "1002" stored in the document type ID field of the relevant document of the record of the second row hit in the search of the document type ID. The controller 101 searches the document database DB4 illustrated in FIG. 6 for a record storing the acquired document type ID "1002." Upon acquiring a document ID "4003" from the document ID field of a record of the third row hit in the search, the controller 101 determines that the document data with the document ID "4003" is document data of the relevant document. Then, as illustrated in the record of the second row in FIG. 7, the controller 101 stores the acquired document ID "4003" in the document ID field of the relevant document of the generated record.

Figure 11:
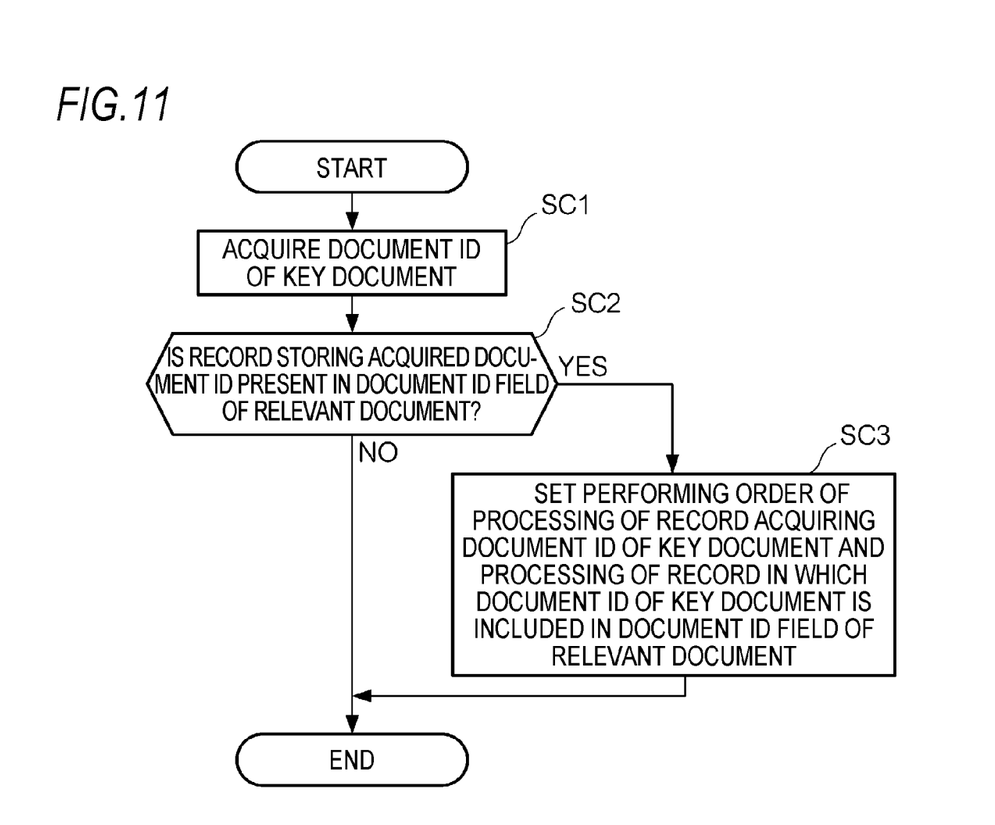
FIG. 11 is a flowchart illustrating a flow of a processing performed by the controller.

Next, the controller 101 (the determining part 1005) performs a processing illustrated in FIG. 11 in order to set a performing order of the processing performed by the operator. First, the controller 101 refers to the records of the processing database DB5 to acquire the document ID stored in the document ID field of the key document (step SC1). Upon acquiring the document ID, the controller 101 determines whether or not a record storing the acquired document ID is present in the document ID field of the relevant document of the processing database DB5 (step SC2).

For example, when the contents of the processing database DB5 are in a state illustrated in FIG. 7, the controller 101 first acquires a document ID "4001" of the key document from the record of the first row of the processing database DB5 illustrated in FIG. 7 (Step SC1). The controller 101 searches the processing database DB5 for a record in which the acquired document ID "4001" is included in the document ID field of the relevant document. When the contents of the processing database DB5 are in the state illustrated in FIG. 7, since there is no record in which the document ID "4001" is included in the document ID field of the relevant document, the determination in the step SC2 is NO and the processing in FIG. 11 is ended.

Next, the controller 101 acquires a document ID "4002" of the key document from the record of the second row of the processing database DB5 (step SC1) and searches the processing database DB5 for a record in which the acquired document ID is included in the document ID field of the relevant document. When the contents of the processing database DB5 are in the state illustrated in FIG. 7, since the record of the first row is a record in which the document ID "4002" is included in the document ID field of the relevant document, the controller 101 makes a determination of "YES" in the step SC2. That is, it is determined that the processing with the processing ID "5002" is a process related to the processing with the processing ID "5001."

When the determination in the step SC2 is YES, the controller 101 sets the performing order between the processing of the record acquiring the document ID of the key document and the processing of the record in which the document ID of the key document is included in the document ID field of the relevant document (step SC3). Here, with regard to the order between the processing related with the record of the second row and the processing related with the record of the first row, the controller 101 determines that the processing related with the record of the second row is anterior and the processing related with the record of the first row is posterior, stores the processing ID "5002" of the record of the second row in the pre-processing ID field of the record of the first row, and stores the processing ID "5001" of the record of the first row in the post-processing ID field of the record of the second row.

Figure 12:
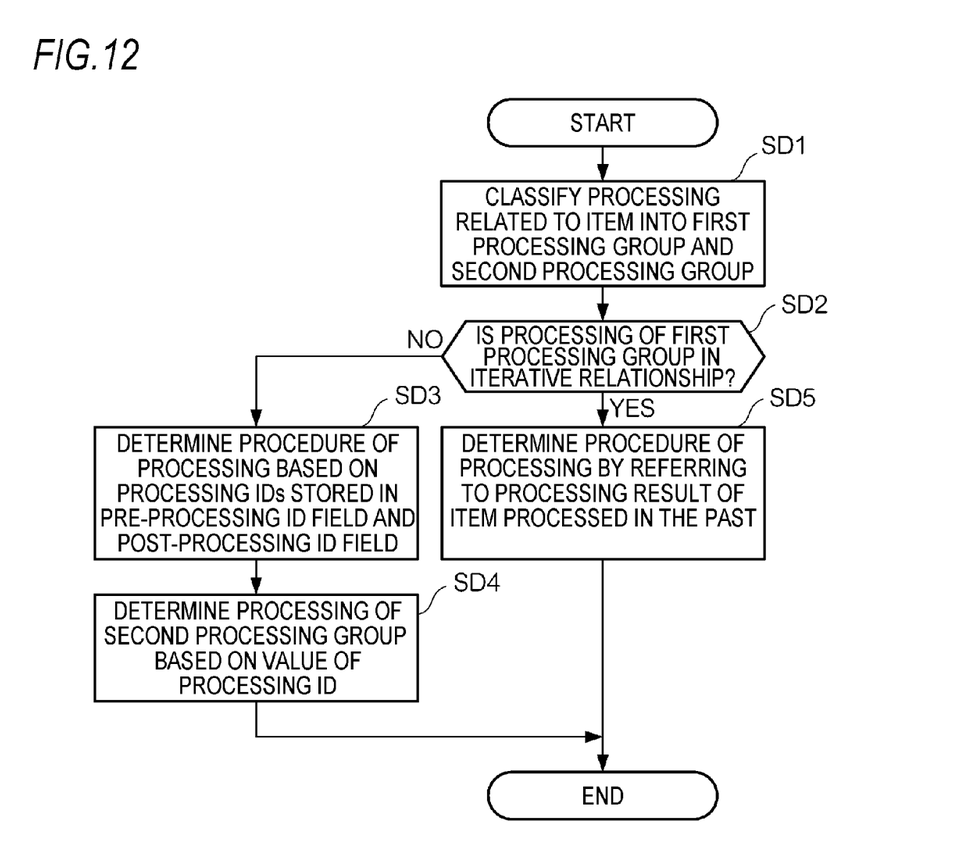
FIG. 12 is a flowchart illustrating a flow of a processing performed by the controller.

Next, an operation performed when the operator of the terminal device 20 performs a processing for an item requested by the requester will be described. The operator operates the terminal device 20 to access the item database DB3 and instruct to start a processing for an item. When this operation is performed in the terminal device 20, the terminal device 20 and the information processing apparatus 10 communicate with each other and the controller 101 performs a processing illustrated in FIG. 12 in order to set a procedure of the processing for the item.

First, the controller 101 (the determining part 1005) refers to the processing database DB5 to classify the processing related to the processing database DB5 into a first processing group having pre-processing or post-processing and a second processing group having no pre-processing and post-processing (step SD1). For example, when the contents of the processing database DB5 are in the state illustrated in FIG. 7, the controller 101 sets a processing with a processing ID "5001" and a processing with a processing ID "5002," as the first processing group, and sets a processing with a processing ID "5003," as the second processing group.

Figure 13A:
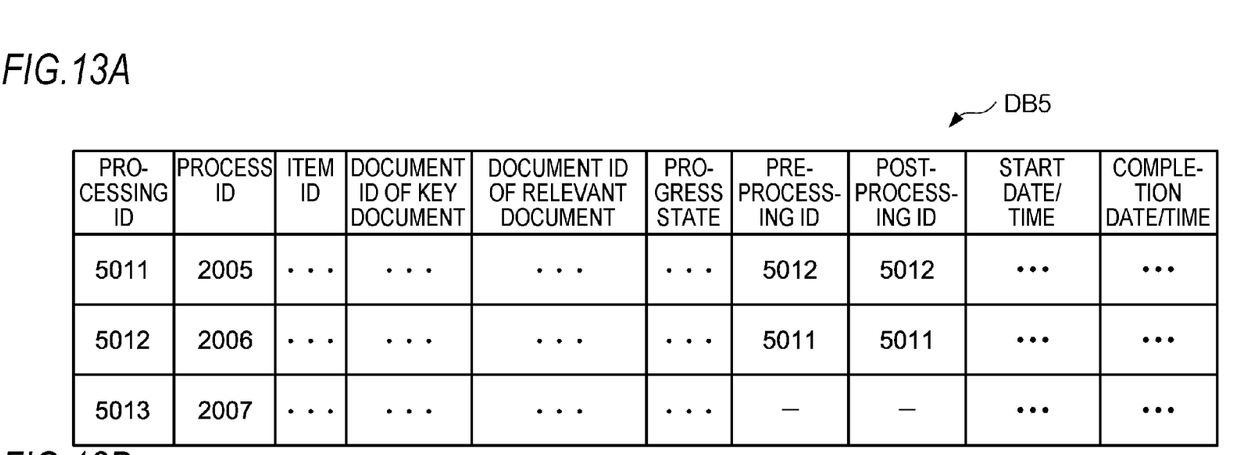
FIGS. 13A and 13B are views illustrating an example of the processing database.

Next, the controller 101 determines that the processing of the first processing group is in an iterative relationship (step SD2). For example, as illustrated in FIG. 13A, in the processing of processing IDs "5011" and "5012" as the processing of the first processing group, when the performing order of processing satisfies a relationship in which the processing of the processing ID "5012" is performed before the processing of the processing ID "5011," and the performing order of processing satisfies a relationship in which the processing of the processing ID "5011" is performed before the processing of the processing ID "5012," the processing of the processing ID "5011" and the processing of the processing ID "5012" are in a relationship between a preceding processing and a subsequent preceding and are also in an iterative relationship.

For example, when the contents of the processing database DB5 are in the state illustrated in FIG. 7, since the processing of the processing ID "5001" and the processing of the processing ID "5002" are not in an iterative relationship, the controller 101 makes a determination of "NO" in the step SD2.

When the determination in the step SD2 is "NO," the controller 101 determines the procedure of each processing for the processing of the first processing group, based on the processing IDs stored in the pre-processing ID field and the post-processing ID field (step SD3). Here, when the contents of the processing database DB5 are in the state illustrated in FIG. 7, since the performing order of the processing satisfies the relationship in which the processing of the processing ID "5002" is performed before the processing of the processing ID "5001," the controller 101 sets the processing procedure of the processing ID "5002" as anterior and sets the processing procedure of the processing ID "5001" as posterior. Further, regarding the processing of the second processing group, for example, the controller 101 determines a procedure in the order from the processing with a smaller value of the processing ID after the processing of the first processing group (step SD4). For the processing of the second processing group, a procedure may be set before the processing of the first processing group.

When the determination in the step SD2 is "YES," the controller 101 determines the procedure of the processing of the first processing group by referring to the processing result of an item processed in the past (step SD5). More specifically, the controller 101 refers to the start date/time of the processing database DB5 of the item processed in the past to determine the procedure of the processing of the first processing group. The controller 101 searches the processing database DB5 having the record of which a relationship between a pre-processing ID and a post-processing ID and process IDs are the same as an item whose procedure is set. The controller 101 refers to the start date/time field of the processing database DB5 hit by search to set the procedure of processing that is started earlier, as anterior, and to set the procedure of processing that is started later, as posterior.

Figure 13B:
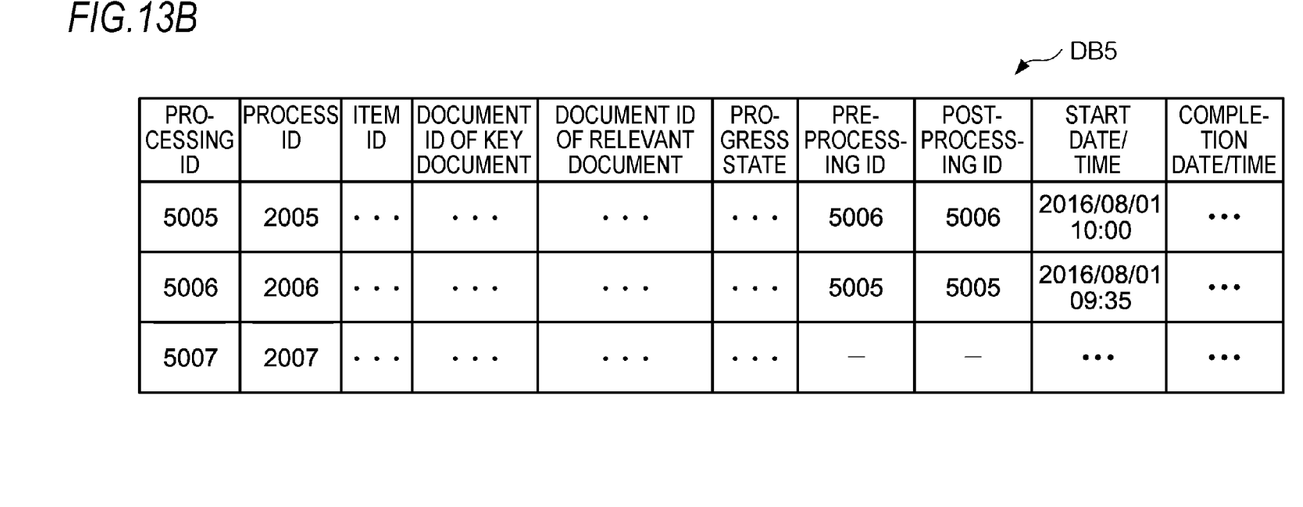

For example, when setting the procedures of the processing of the processing IDs "5011" and "5012" in FIG. 13A, the controller 101 refers to the processing DB in FIG. 13B of which the relationship between the pre-processing ID and the post-processing ID and the process IDs are the same as an item whose procedure is set. In the processing database DB5 in FIG. 13B, since processing having a process ID "2006" is performed first, the controller 101 sets the procedure of processing having a processing ID "5012" as anterior and sets the procedure of processing having a processing ID "5011" as posterior. In addition, when the processing database DB5 of which the relationship between the pre-processing ID and the post-processing ID and the process IDs are the same as an item whose procedure is set is not found in the search, the controller 101 performs processing in an iterative relationship in parallel and sets a procedure so as to perform the processing in parallel.

Upon completing the setting of the procedure of processing, the controller 101 causes the operator of the terminal device 20 to perform the processing of each processing ID of the processing database DB5 according to the set procedure. According to the present exemplary embodiment, since the information processing apparatus 10 determines the procedure of processing to be performed for plural read documents, it is possible to proceed with processing of the read documents without bothering the operator hands.

[Modified Examples]

Although the exemplary embodiment of the present invention has been described above, the present invention is not limited to the above exemplary embodiment but may be practiced in various other forms. For example, the present invention may be practiced with the following modified examples of the above exemplary embodiment. It should be noted that the above exemplary embodiment and the following modified examples may be used in combination.

In the exemplary embodiment of the present invention, while the operator is processing document data, if there is incompleteness in a key document related to the corresponding processing, the incomplete key document maybe notified to the requester who is then requested to submit the key document again. In addition, the document data of the key document to be re-submitted from the requester in response to the notification may be stored in the storage unit 102 with the same document ID as the incomplete document. According to this configuration, instead of re-submitting all the documents related to an item, only the document which is incomplete may be re-submitted so that the document data of the re-submitted document may be processed.

In the exemplary embodiment of the present invention, while the operator is displaying a key document on the terminal device 20 and is processing the key document, a relevant document may be displayed on the terminal device 20 according to the operation by the operator. According to this configuration, it is possible to refer to a document related to a processing being performed by the operator.

In the exemplary embodiment of the present invention, while the operator is displaying a key document on the terminal device 20 and is processing the key document, if a new document related to the processing being performed is required, the document required for the processing may be notified to the requester who is then requested to submit the document. With respect to the newly submitted document, information may be stored in the document database DB4 with the same item ID.

A program according to the exemplary embodiment of the present invention may be provided and installed in a state where the program is stored in a computer-readable recording medium such as a magnetic recording medium (a magnetic tape, a magnetic disk (HDD (Hard Disk Drive), an FD (Flexible Disk), or the like), an optical recording medium (an optical disc, or the like), a magneto-optical recording medium, or a semiconductor memory.

Alternatively, the program may be downloaded and installed via a communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
  acquire document images of a plurality of documents;
  specify, based on the acquired document images, types of the plurality of documents;
  classify each of the plurality of documents, based on the specified type, into either:
    a key document as a target of one of a plurality of predetermined processings; or
    a relevant document required for performing one of the plurality of the predetermined processings;
  store the classification of each of the plurality of documents in a memory;
  specify a particular one of the predetermined processings corresponding to a classified key document; and
  in a case where a plurality of classified key documents are specified:
    specify a dependency relationship of processing specified for the plurality of the classified key documents among each specified key document and a relevant document related to the particular predetermined processing;
    determine a performing order of the processings specified for the plurality of classified key documents based on the specified dependency relationship; and
    cause processing of the processings of the plurality of specified key documents according to the determined performing order.

2. The information processing apparatus according to claim 1, wherein the processor is further programmed to: when the plurality of key documents are specified, and a processing for each of the plurality of specified key documents are specified, determine a performing order of a plurality of specified processings based on histories of processing for other documents for which the same processing is performed.

3. A non-transitory computer readable medium storing a program including computer-executable instructions that, when executed by computer, cause the computer to:
acquire document images of a plurality of documents;
specify, based on the acquired document images, types of the plurality of documents;
classify each of the plurality of documents, based on the specified type, into either:
  a key document as a target of one of a plurality of predetermined processings; or
  a relevant document required for performing one of the plurality of the predetermined processings;
store the classification of each of the plurality of documents in a memory;
specify a particular one of the predetermined processings corresponding to a classified key document; and
in a case where a plurality of classified key documents are specified:
  specify a dependency relationship of processing specified for the plurality of the classified key documents among each specified key document and a relevant document related to the particular predetermined processing;
  determine a performing order of the processings specified for the plurality of classified key documents based on the specified dependency relationship; and
  cause processing of the processings of the plurality of specified key documents according to the determined performing order.

4. The non-transitory computer readable medium according to claim 3, wherein the computer-executable instructions further include instructions that, when executed by the computer, cause the computer to: when the plurality of key documents are specified, and a processing for each of the plurality of specified key documents are specified, determine a performing order of a plurality of specified processings based on histories of processing for other documents for which the same processing is performed.

5. An information processing system comprising:
a reading device that optically reads a plurality of documents and forms a corresponding plurality of document images of a plurality of documents; and
an information processing apparatus that includes:
  a processor programmed to:
    acquire the plurality of document images;
    specify, based on the acquired document images, types of the plurality of documents;
    classify each of the plurality of documents, based on the specified type, into either:
      a key document as a target of one of a plurality of predetermined processings; or
      a relevant document required for performing one of the plurality of the predetermined processings;
    store the classification of each of the plurality of documents in a memory;
    specify a particular one of the predetermined processings corresponding to a classified key document; and
    in a case where a plurality of classified key documents are specified:
      specify a dependency relationship of processing specified for the plurality of the classified key documents among each specified key document and a relevant document related to the particular predetermined processing;
      determine a performing order of the processings specified for the plurality of classified key documents based on the specified dependency relationship; and
      cause processing of the processings of the plurality of specified key documents according to the determined performing order.

6. The information processing system according to claim 5, wherein the processor is further programmed to: when the plurality of key documents are specified, and a processing for each of the plurality of specified key documents are specified, determine a performing order of a plurality of specified processings based on histories of processing for other documents for which the same processing is performed.

\* \* \* \* \*